(12) United States Patent
Zheng

(10) Patent No.: US 8,342,226 B2
(45) Date of Patent: Jan. 1, 2013

(54) COLLAPSIBLE SUNSHADE

(75) Inventor: Yu Zheng, Walnut, CA (US)

(73) Assignee: Patent Category Corp., Walnut, CA (US)

( * ) Notice: Subject to any disclaimer, the term of this patent is extended or adjusted under 35 U.S.C. 154(b) by 76 days.

(21) Appl. No.: 12/924,297

(22) Filed: Sep. 23, 2010

(65) Prior Publication Data
US 2012/0073770 A1    Mar. 29, 2012

(51) Int. Cl.
B60J 3/00    (2006.01)
(52) U.S. Cl. .................................. 160/370.21
(58) Field of Classification Search ............ 160/370.21, 160/179; 135/93, 117; 296/97.7, 97.8
See application file for complete search history.

(56) References Cited

U.S. PATENT DOCUMENTS

| 1,217,932 | A |   | 3/1917  | Fitzgerald |
|-----------|---|---|---------|------------|
| 1,691,904 | A |   | 11/1928 | Gamble |
| 1,990,804 | A |   | 2/1935  | Watson |
| 3,014,516 | A |   | 12/1961 | Muller |
| 3,288,157 | A |   | 11/1966 | Szkolny |
| 3,675,667 | A |   | 7/1972  | Miller |
| 3,929,145 | A |   | 12/1975 | Schroeder |
| 3,960,161 | A |   | 6/1976  | Norman |
| 3,990,463 | A |   | 11/1976 | Norman |
| 4,073,105 | A |   | 2/1978  | Daugherty |
| 4,716,918 | A |   | 1/1988  | Hayashida et al. |
| 4,759,581 | A | * | 7/1988  | McNamee ................. 296/97.7 |
| 4,779,918 | A | * | 10/1988 | McNamee ................. 296/95.1 |
| 4,815,784 | A |   | 3/1989  | Zheng |
| 4,825,892 | A |   | 5/1989  | Norman |
| 4,858,634 | A |   | 8/1989  | McLeese |
| 4,938,243 | A |   | 7/1990  | Foster |
| 5,024,262 | A |   | 6/1991  | Huang |
| 5,031,652 | A |   | 7/1991  | Lester |
| 5,035,460 | A |   | 7/1991  | Huang |
| 5,038,812 | A |   | 8/1991  | Norman |
| 5,116,273 | A |   | 5/1992  | Chan |
| 5,137,044 | A |   | 8/1992  | Brady |
| 5,163,461 | A |   | 11/1992 | Ivanovich et al. |
| 5,213,147 | A |   | 5/1993  | Zheng |
| 5,249,592 | A |   | 10/1993 | Springer et al. |
| 5,337,772 | A |   | 8/1994  | Habchi |
| 5,343,887 | A |   | 9/1994  | Danaher |
| 5,358,440 | A |   | 10/1994 | Zheng |
| 5,370,145 | A |   | 12/1994 | Wu |
| 5,385,165 | A |   | 1/1995  | Hazinski et al. |

(Continued)

FOREIGN PATENT DOCUMENTS

FR    2635136    2/1990

(Continued)

Primary Examiner — Blair M. Johnson
(74) Attorney, Agent, or Firm — Raymond Sun

(57) ABSTRACT

A collapsible sunshade according to the present invention has a panel comprising a foldable frame member having a folded and an unfolded orientation, the frame member defining a periphery for the panel with an interior space inside of the periphery, a meshed material covering the interior space defined by the frame member to form the panel when the frame member is in the unfolded orientation, and a shade fabric having at least a portion thereof removably attached to the panel so that the shade fabric can assume a first position in which the shade fabric completely overlies, in a planar manner, the meshed material, and a second position where the portion of the shade fabric that is removably attached to the panel is disengaged from the panel to expose a portion of the meshed material.

14 Claims, 13 Drawing Sheets

U.S. PATENT DOCUMENTS

| | | |
|---|---|---|
| 5,396,917 A | 3/1995 | Hazinski et al. |
| 5,411,046 A | 5/1995 | Wan |
| 5,430,980 A | 7/1995 | Ferrier |
| 5,439,018 A | 8/1995 | Tsai |
| 5,439,107 A | 8/1995 | Brown |
| 5,553,908 A | 9/1996 | Shink |
| 5,560,385 A | 10/1996 | Zheng |
| D375,928 S | 11/1996 | Wang |
| 5,575,324 A | 11/1996 | Hwang |
| 5,579,799 A | 12/1996 | Zheng |
| 5,592,961 A | 1/1997 | Chin |
| 5,601,105 A | 2/1997 | Blen et al. |
| 5,618,246 A | 4/1997 | Zheng |
| RE35,571 E | 7/1997 | McLeese |
| 5,642,750 A | 7/1997 | Brown et al. |
| 5,645,096 A | 7/1997 | Hazinski et al. |
| 5,671,479 A | 9/1997 | Dedrick |
| 5,676,168 A | 10/1997 | Price |
| 5,687,786 A | 11/1997 | Tsai |
| 5,709,237 A | 1/1998 | Sargeant et al. |
| 5,732,759 A * | 3/1998 | Wang ................. 160/370.21 |
| 5,735,608 A | 4/1998 | Branco |
| 5,778,915 A | 7/1998 | Zheng |
| 5,800,067 A | 9/1998 | Easter |
| 5,816,278 A | 10/1998 | Kim |
| D400,949 S | 11/1998 | Gale |
| D412,354 S | 7/1999 | Takos |
| 5,927,793 A | 7/1999 | McGrath, Jr. |
| 6,006,772 A | 12/1999 | Zheng |
| 6,092,544 A | 7/2000 | Zheng |
| D429,307 S | 8/2000 | Wu et al. |
| 6,109,281 A | 8/2000 | Lowenthal |
| 6,109,282 A | 8/2000 | Yoon |
| 6,155,329 A | 12/2000 | Hwang et al. |
| 6,192,635 B1 | 2/2001 | Zheng |
| 6,216,716 B1 | 4/2001 | Gobel |
| 6,267,128 B1 | 7/2001 | Zheng |
| 6,267,129 B1 | 7/2001 | Zheng |
| 6,273,368 B1 | 8/2001 | Zheng |
| 6,289,910 B1 | 9/2001 | Zheng |
| 6,296,003 B1 * | 10/2001 | Howe et al. ................. 135/117 |
| 6,302,127 B1 | 10/2001 | Gayton |
| 6,305,396 B1 | 10/2001 | Zheng |
| 6,325,086 B1 | 12/2001 | Shinner et al. |
| 6,328,050 B1 | 12/2001 | McConnell |
| 6,357,510 B1 | 3/2002 | Zheng |
| 6,390,111 B2 | 5/2002 | Zheng |
| D461,638 S | 8/2002 | Kellogg et al. |
| 6,453,923 B2 | 9/2002 | Zheng |
| 6,460,556 B2 | 10/2002 | Zheng |
| RE37,924 E | 12/2002 | Kellogg et al. |
| 6,494,335 B1 | 12/2002 | Kellogg et al. |
| 6,527,136 B1 | 3/2003 | Sabounjian |
| 6,604,537 B2 | 8/2003 | Zheng |
| 6,668,847 B2 | 12/2003 | Zheng |
| 6,684,894 B2 | 2/2004 | Zheng |
| 6,694,994 B1 | 2/2004 | Zheng |
| 6,698,441 B1 | 3/2004 | Zheng |
| 6,702,119 B2 | 3/2004 | Sabounjian |
| 6,705,338 B2 | 3/2004 | Zheng |
| 6,758,003 B2 | 7/2004 | Zheng |
| 6,766,815 B2 | 7/2004 | Zheng |
| 6,782,905 B2 | 8/2004 | Chu et al. |
| 6,848,460 B2 | 2/2005 | Zheng |
| 6,926,020 B2 | 8/2005 | Zheng |
| 6,928,951 B2 | 8/2005 | Huang |
| 7,011,355 B1 * | 3/2006 | Su ................. 296/97.7 |
| 7,031,147 B2 | 4/2006 | Zheng |
| 7,080,653 B2 | 7/2006 | Zheng |
| 7,225,822 B1 | 6/2007 | Zheng |
| D551,452 S | 9/2007 | Kellogg et al. |
| 7,267,625 B2 | 9/2007 | Zheng |
| 2004/0237877 A1 | 12/2004 | Huang |

FOREIGN PATENT DOCUMENTS

| | | |
|---|---|---|
| GB | 2340516 | 3/2000 |
| WO | WO 97/14863 | 4/1997 |

* cited by examiner

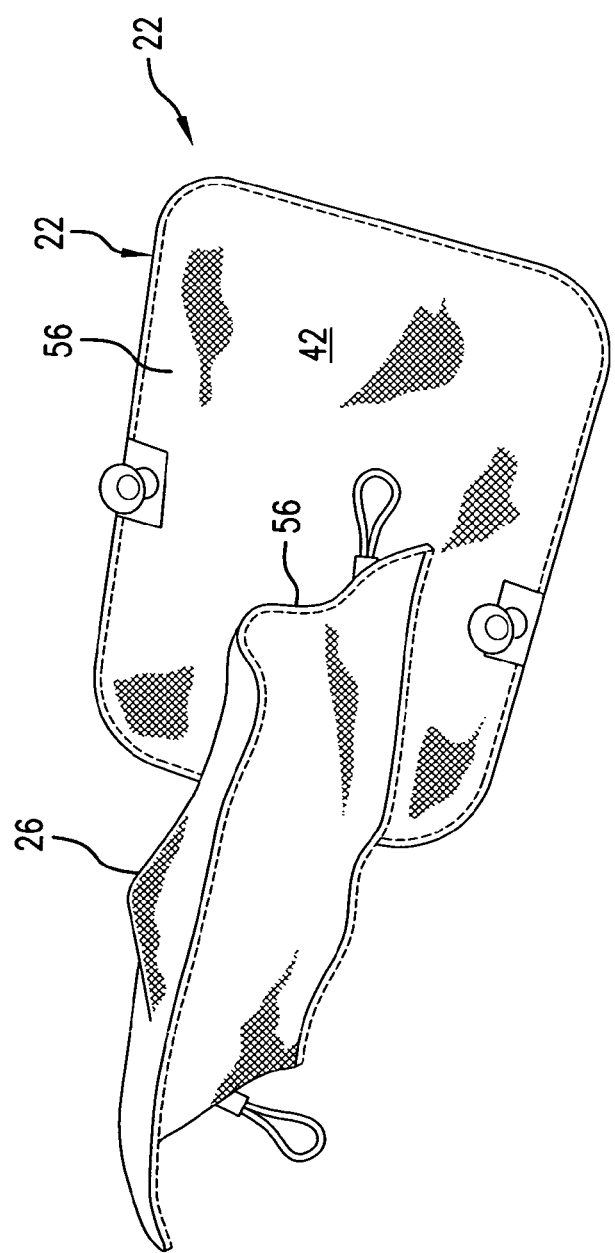

COLLAPSIBLE SUNSHADE

BACKGROUND OF THE INVENTION

1. Field of the Invention

The present invention relates to collapsible structures, and in particular, to collapsible sunshades that can be used for multiple purposes.

2. Description of the Prior Art

Collapsible sunshades have been well-known for some time, as illustrated by the sunshades shown and described in U.S. Pat. Nos. 5,024,262 (Huang), 4,815,784 (Zheng), 5,732,759 (Wan) and 5,553,908 (Shink), among others. All of these sunshades are provided solely for the purpose of blocking sunlight at a window or windshield when the vehicle is parked. None of these sunshades are capable of being used when the vehicle is in motion.

There are other sunshades that are adapted for use when the vehicle is in motion. While these sunshades can provide partial shade to the occupants inside a vehicle, these sunshades are not effective in blocking heat and sunlight.

SUMMARY OF THE DISCLOSURE

It is an object of the present invention to provide a collapsible sunshade that can be deployed for different uses in an automobile.

It is another object of the present invention to provide a collapsible sunshade that can be deployed for use in different environments, including use in the house or locations other than inside an automobile.

In order to accomplish the objects of the present invention, the collapsible sunshade according to the present invention has a panel comprising a foldable frame member having a folded and an unfolded orientation, the frame member defining a periphery for the panel with an interior space inside of the periphery, a meshed material covering the interior space defined by the frame member to form the panel when the frame member is in the unfolded orientation, and a shade fabric having at least a portion thereof removably attached to the panel so that the shade fabric can assume a first position in which the shade fabric completely overlies, in a planar manner, the meshed material, and a second position where the portion of the shade fabric that is removably attached to the panel is disengaged from the panel to expose a portion of the meshed material.

BRIEF DESCRIPTION OF THE DRAWINGS

FIGS. 9-15 illustrate other embodiments of sunshades according to the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
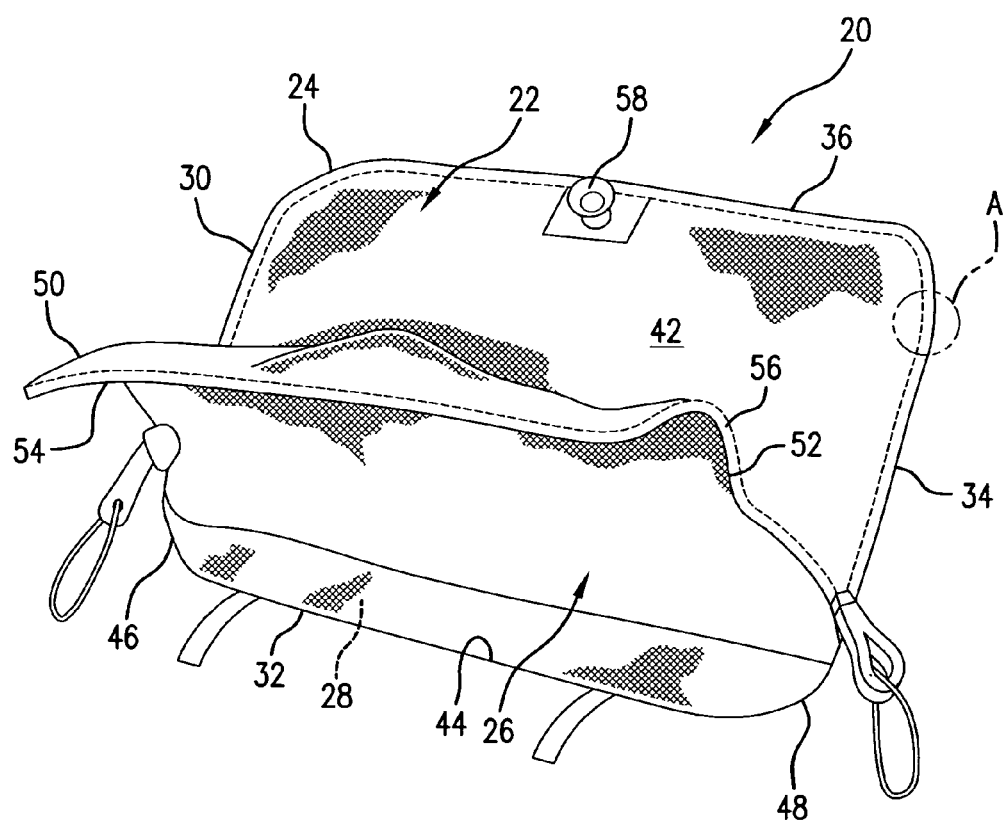
FIG. 1 is a perspective view of a collapsible sunshade according to one embodiment of the present invention.
Figure 5:
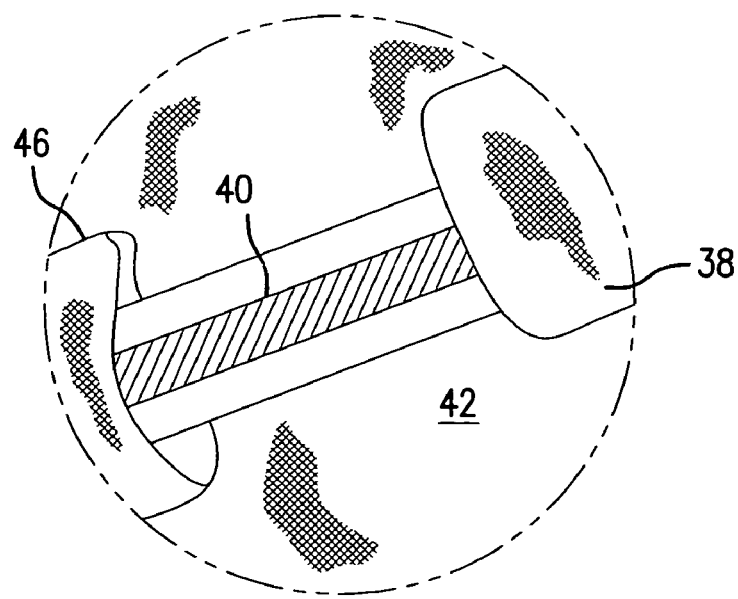
FIG. 5 is a partial cut-away view of the section A of the structure of FIG. 1 illustrating a frame member retained within a sleeve.

As shown in FIGS. 1 and 5, the sunshade 20 is comprised of a single panel 22. The panel 22 can have four sides, such as a left side 30, a bottom side 32, a right side 34 and a top side 36, although the panel 22 can assume any configuration and have any number of sides (e.g., square, rectangular, oval). The panel 22 has a frame retaining sleeve 38 provided along and traversing the four edges of its four sides. A frame member 40 is retained or held within each respective frame retaining sleeve 38 to support the panel 22.

The frame member 40 may be provided as one continuous loop, or may comprise a strip of material connected at both ends to form a continuous loop. The frame member 40 is preferably formed of flexible coilable steel, although other materials such as plastics may also be used. The frame member 40 should be made of a material which is relatively strong and yet is flexible to a sufficient degree to allow it to be coiled. Thus, each frame member 40 is capable of assuming two positions or orientations, an open or expanded position such as shown in FIG. 1, or a folded position in which the frame member 40 is collapsed into a size which is much smaller than its open position (see FIG. 4C). The frame member 40 may be merely retained within the frame retaining sleeve 38 without being connected thereto. Alternatively, the frame retaining sleeve 38 may be mechanically fastened, stitched, fused, or glued to the frame member 40 to retain it in position.

A meshed material 42 extends across the panel 22, and is held taut by the frame member 40 when in its open position. The meshed material is made from strong, lightweight materials and may include woven fabrics or nylons. The meshed material 42 defines a plurality of small uniform openings 24 so that a person can see through the meshed material 42 through these openings 24. The meshed material 42 should be water-resistant and durable to withstand the wear and tear associated with rough treatment.

In addition, a shade fabric 26 is provided to extend across the meshed material 42 in the interior space defined by the sides of the panel 22. The shade fabric 26 can be provided in the form of a fabric material that has a reflective surface that is adapted to reflect sunlight and heat. The shade fabric 26 is preferably made from strong, lightweight materials that are adapted to withstand sunlight and heat, such as nylons, thick fabrics, and the like. In the embodiment shown in FIG. 1, the shade fabric 26 has a lower edge 44 that is permanently attached (e.g., by stitching) to the bottom side 32 of the panel 22. Lower portions 46 and 48 of the left edge 50 and right edge 52, respectively, of the shade fabric 26 are permanently attached (e.g., by stitching) to the lower portions of the left and right sides 30 and 34, respectively, of the panel 22. The permanent attachment of the lower edge 44 and lower portions 46, 48 to the meshed material 42 defines a pocket 28. The rest of the left and right edges 50, 52 of the shade fabric 26 are not permanently attached to the left and right sides 30 and 34, respectively, of the panel 22, but are instead adapted to be removably attached to the left and right sides 30 and 34, respectively, of the panel 22. The removable attachment can be accomplished by a number of different mechanisms. For example, in FIG. 1, the mechanism can be a zipper 56 provided along the edges 50, 52 and the top edge 54 of the shade fabric 26 and the left, right and top sides 30, 34 and 36 of the panel 22.

Figure 2:
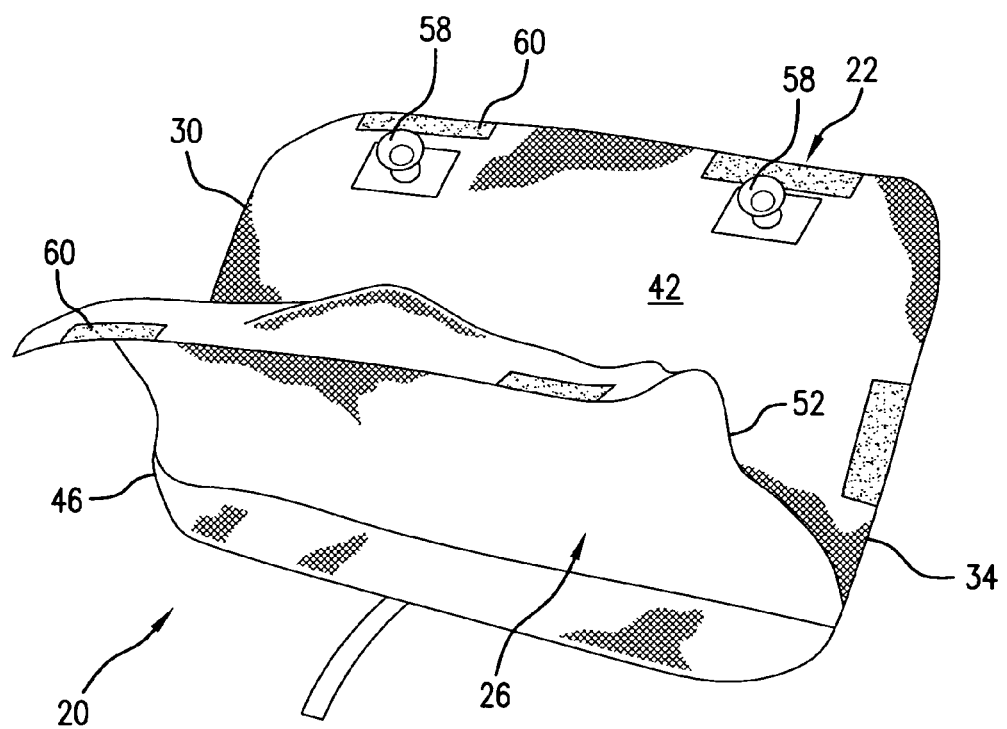
FIG. 2 illustrates a modification that can be made to the sunshade of FIG. 1.
Figure 3A:
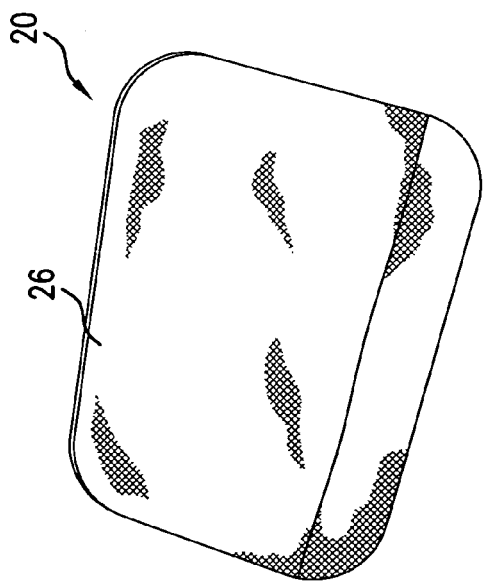
FIGS. 3A-3D illustrate the two different uses for the sunshade of FIG. 1.
Figure 3B:
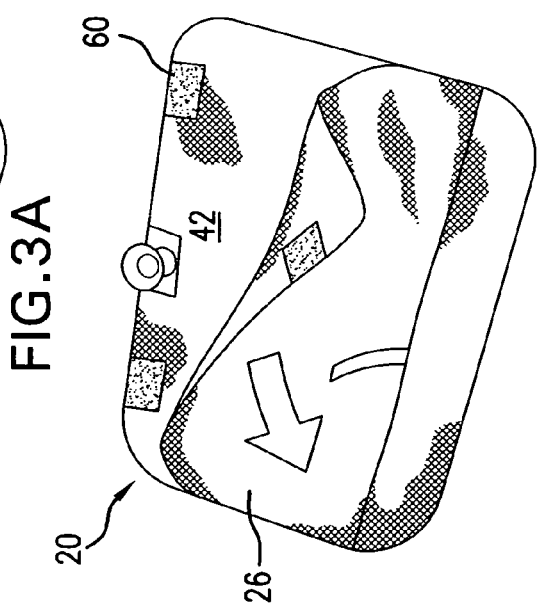
Figure 3C:
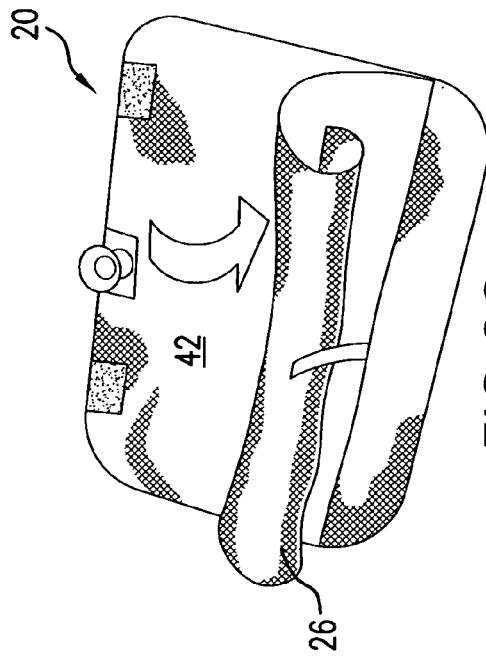
Figure 3D:
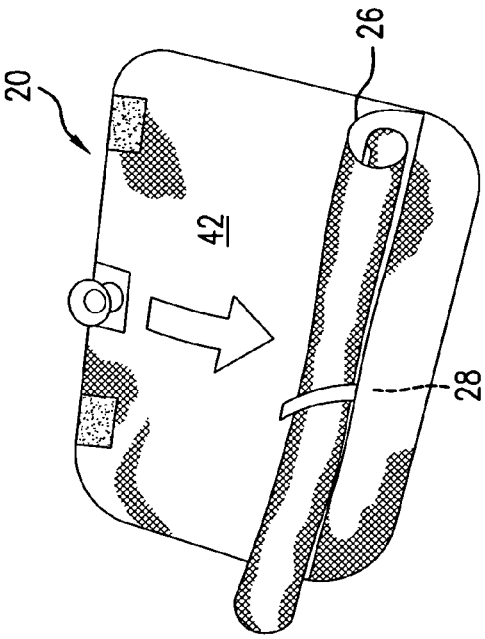

FIG. 2 illustrates the use of opposing VELCRO™ pads 60 instead of the zipper 56. These pads 60 can be provided in spaced-apart manner along the edges 50, 52, 54 of the shade fabric 26 and the sides 30, 34 and 36 of the panel 22 to facilitate removable engagement thereof.

The shade fabric 26 is adapted to be folded (or rolled) and tucked into the pocket 28. This allows the sunshade 20 to be used in two different ways: a first use where the shade fabric 26 is attached to the rest of the panel 22 in a manner such that the shade fabric 26 overlies the meshed material 42, and a second use where enough of the periphery of shade fabric 26 is detached from the panel 22 so that the detached portion of the shade fabric 26 is tucked into the pocket 28, thereby exposing a portion of the meshed material 42. In the first use, the sunshade 20 can be deployed against a window or windshield for use when the vehicle is parked, and in the second use, the sunshade 20 can be deployed against a window or windshield while the vehicle is in motion. In the second use, the exposed portion of the meshed material 42 allows the occupants of the vehicle to see through the exposed portion of the meshed material 42 to the outside of the vehicle. Referring to FIGS. 3A-3D, FIG. 3A shows the sunshade 20 configured to be deployed against a window or windshield when the vehicle is parked, with the shade fabric 26 overlying the meshed material 42. To convert the sunshade 20 to the second use, the shade fabric 26 is detached from the meshed material 42 by detaching the VELCRO™ pads 60 (or the zipper 56) (see FIG. 3B), and then rolling (or folding) the shade fabric 26 (see FIG. 3C) and tucking the rolled (or folded) shade fabric 26 into the pocket 28 (see FIG. 3D).

Suction cups 58 can be attached to the meshed material 42 and/or the shade fabric 26 at the location of the pocket 28. The suction cups 58 allow for the sunshade 20 to be removably attached to the inner surface of a window or windshield.

Figure 4A:
FIGS. 4A through 4C illustrate how the sunshade of FIG. 1 may be twisted and folded for compact storage.
Figure 4B:
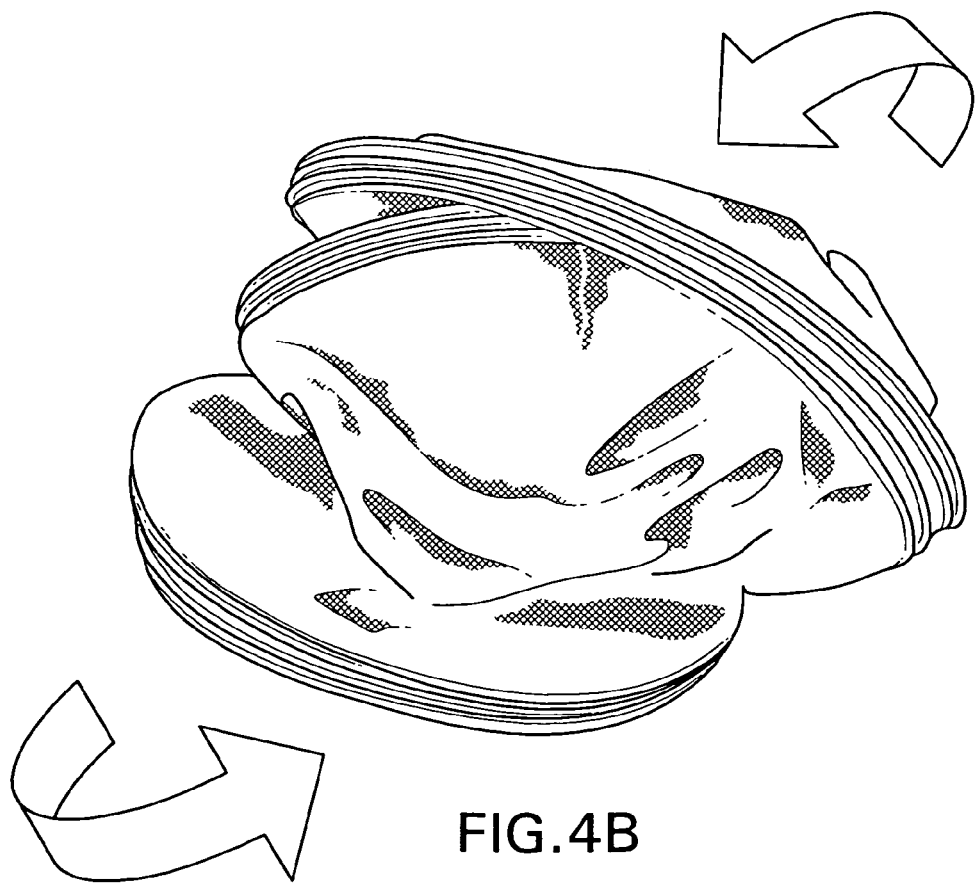
Figure 4C:
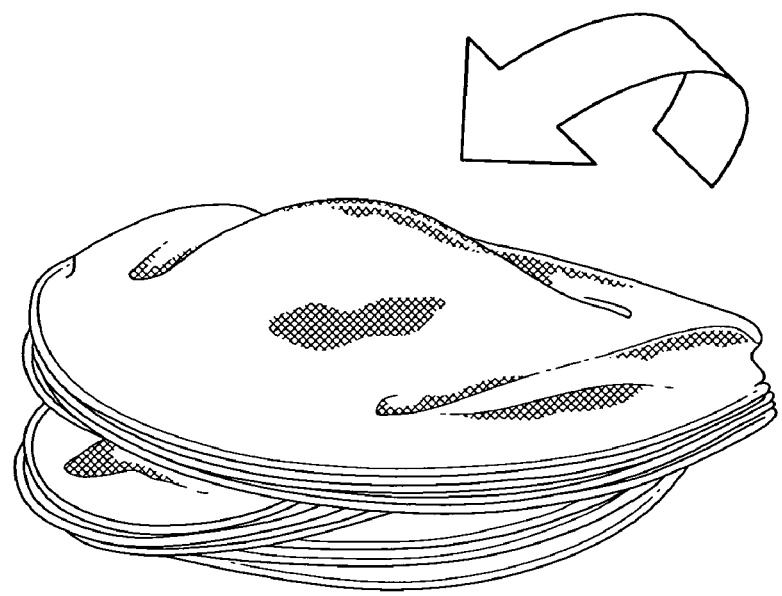

FIGS. 4A through 4C describe the various steps for folding and collapsing the sunshade 20 of FIG. 1 for storage. The first step consists of twisting and folding to collapse the frame member 40 and panel 22 into a smaller shape. In particular, the opposite border of the panel 22 is folded in (see arrow 2 in FIG. 4A) upon the previous fold to further collapse the frame member 40 with the panel 22. As shown in FIG. 4B, the folding is continued so that the initial size of the sunshade 20 is reduced until the frame member 40 and panel 22 are collapsed on each other (see FIG. 4C) to provide for a small essentially compact configuration having a plurality of concentric frame members 40 and layers of the panel 22 so that the collapsed sunshade 20 has a size which is a fraction of the size of the initial structure.

Figure 6A:
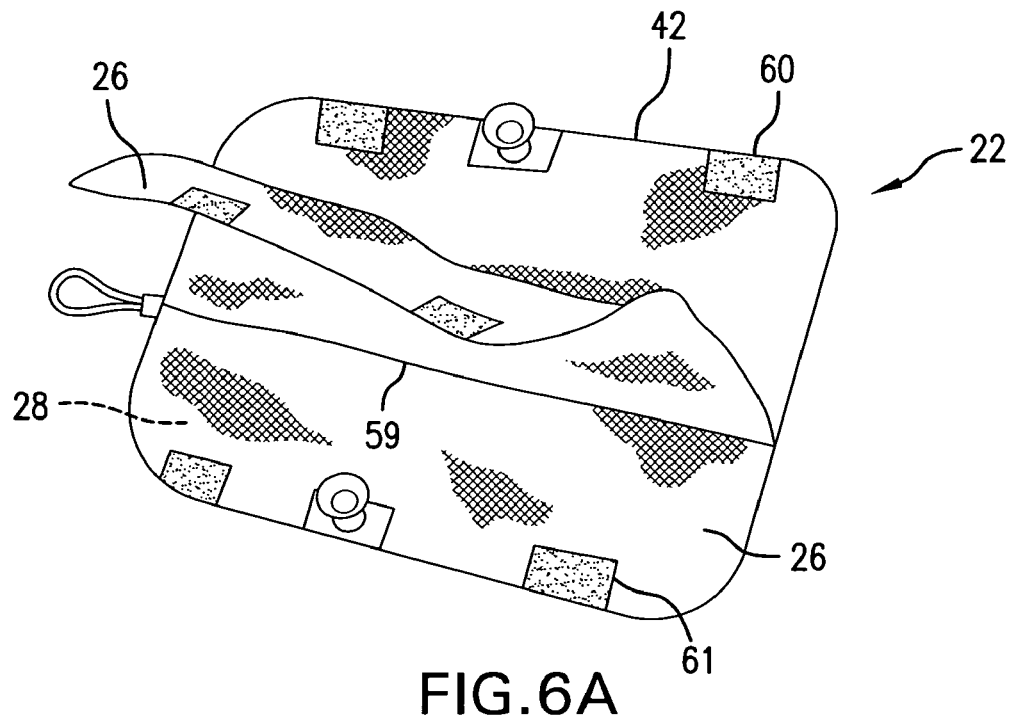
FIGS. 6A and 6B illustrate a modification that can be made to the sunshade of FIG. 1
Figure 6B:
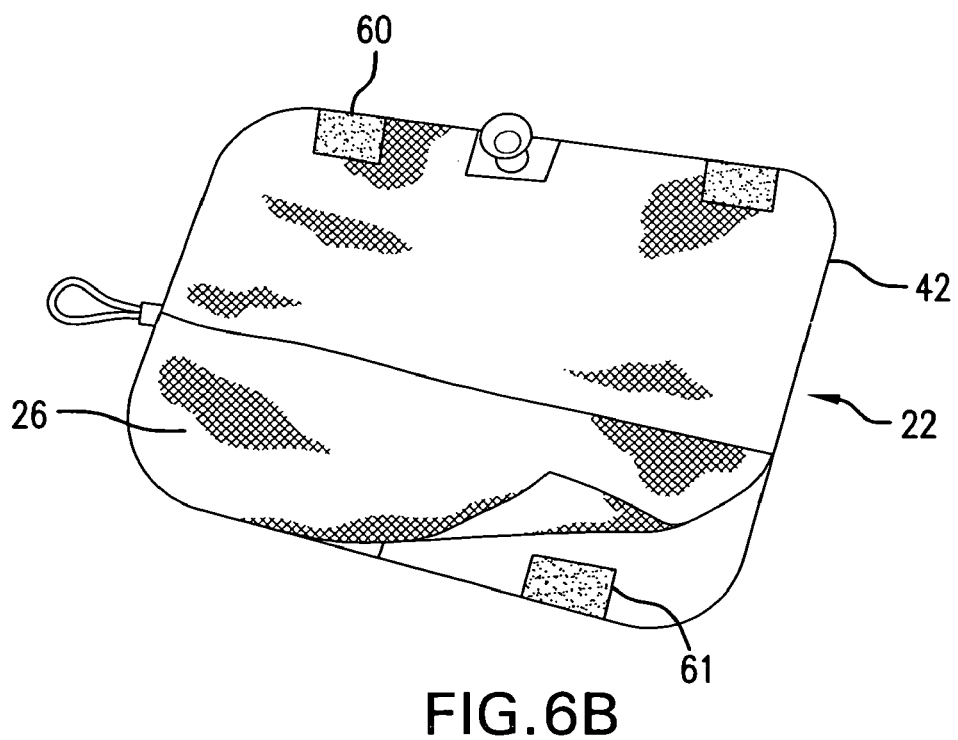

FIGS. 6A and 6B illustrate another modification that can be made to the sunshade 20 of FIG. 1. The lower portions 46 and 48 of the left edge 50 and right edge 52, respectively, of the shade fabric 26 that are permanently attached to the lower portions of the left and right sides 30 and 34, respectively, of the panel 22 can be lengthened, with a stitch line 59 provided across the top of the pocket 28 to attach the shade fabric 26 to the mesh material 42 along the stitch line 59. Removable attachment mechanisms (e.g., VELCRO™ pads 61) can be provided along the periphery of the outer surface of the shade fabric 26 so that the upper unattached portion of the shade fabric 26 can be folded over about the stitch line 59, and opposing pads 61 removably attached to each other (see FIG. 6B) to secure the upper portion of the shade fabric 26 to the pocket 28. The embodiment in FIGS. 6A and 6B provides a larger lower portion of the shade fabric 26.

Figure 8:
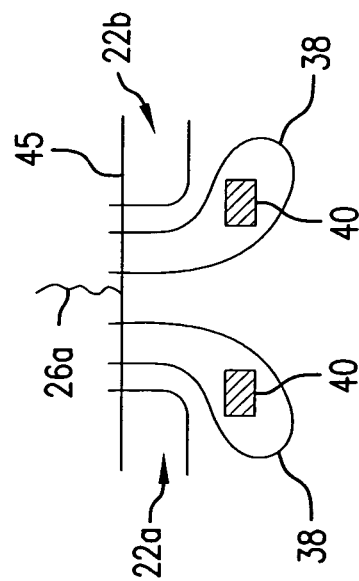
FIG. 8 is a cross-sectional view of the section 8-8 in FIG. 7.
Figure 7:
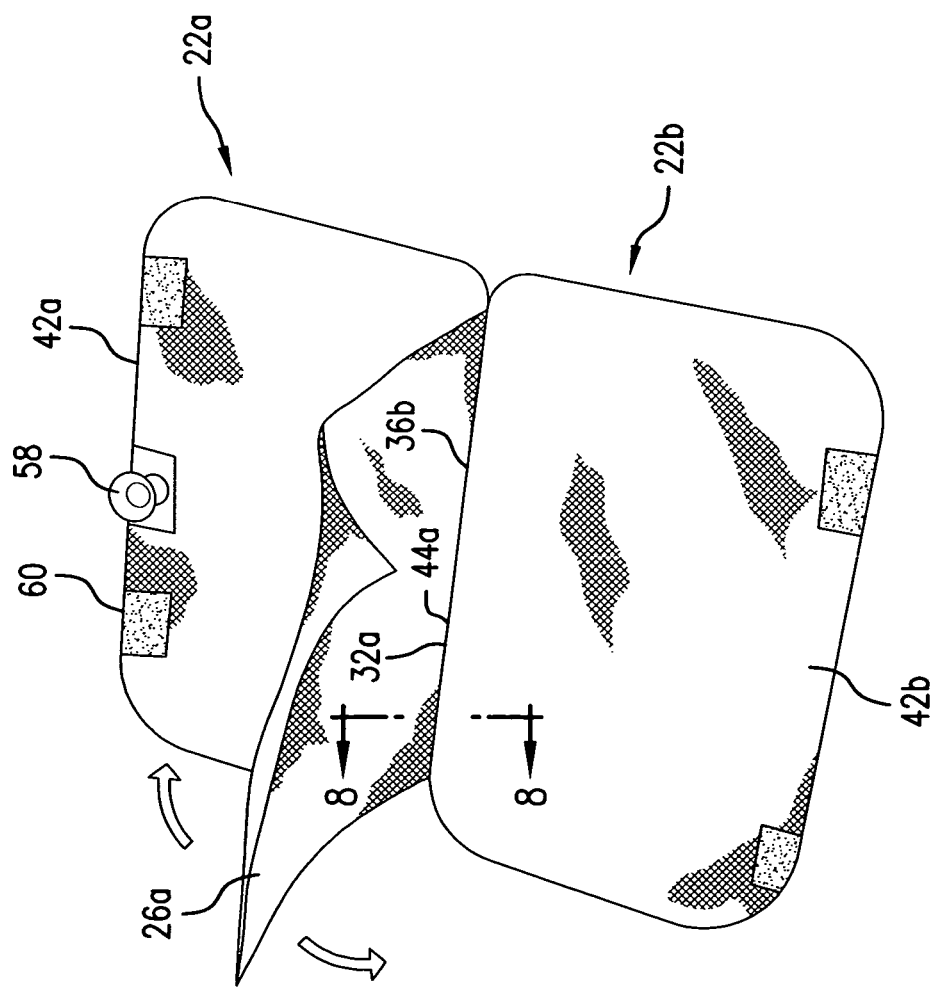
FIG. 7 illustrates another embodiment of the sunshade of the present invention.

FIG. 7 illustrates another embodiment of the present invention, where the sunshade now includes a first panel 22a and a second panel 22b positioned such that the two panels 22a and 22b are hingedly connected to each other along adjacent sides 32a and 36b, respectively. The two panels 22a, 22b can be identical in construction to the panel 22 in FIG. 1, except that both panels 22a, 22b now share the shade fabric 26. FIG. 8 illustrates one possible connection for connecting adjacent sides 32a, 36b. The meshed materials 42a, 42b are stitched at their edges by a stitching 45 to the respective sleeves 38. Each sleeve 38 may be formed by folding a piece of fabric. The stitching 45 also acts as a hinge for the panels 22a and 22b to be folded upon each other, as explained below.

A single shade fabric 26a is provided, and has one edge 44a stitched to the hinged connection shown in FIG. 8. The shade fabric 26a can be removably attached to either meshed material 42a or 42b via the same removable attachment mechanisms described above. To fold and collapse the two panels 22a, 22b, one panel 22a is folded on top of the other panel 22b, with the shade fabric 26a between the two panels 22a, 22b, and then the combined panels 22a, 22b can be twisted and folded according to the method shown in FIGS. 4A-4C.

Figure 10:
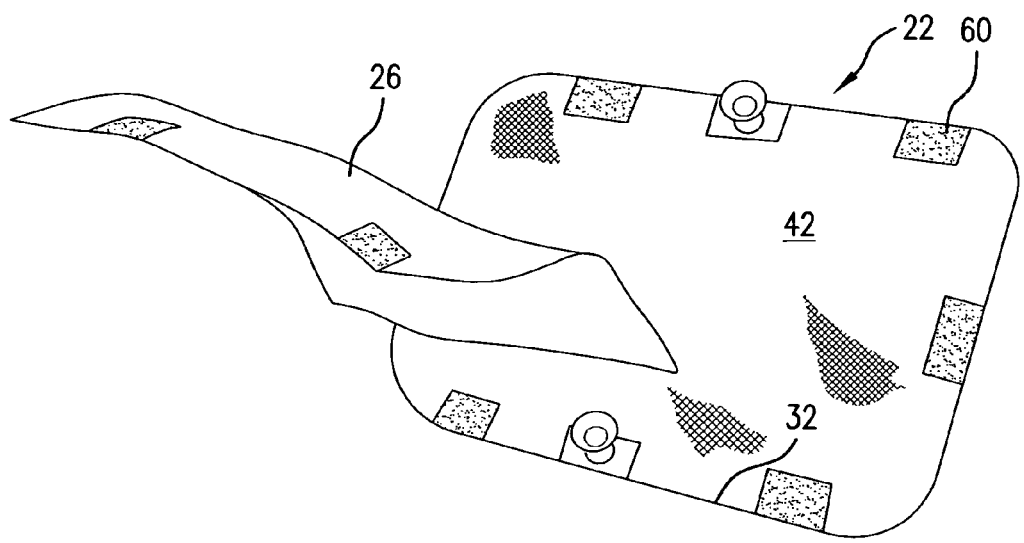
Figure 11:
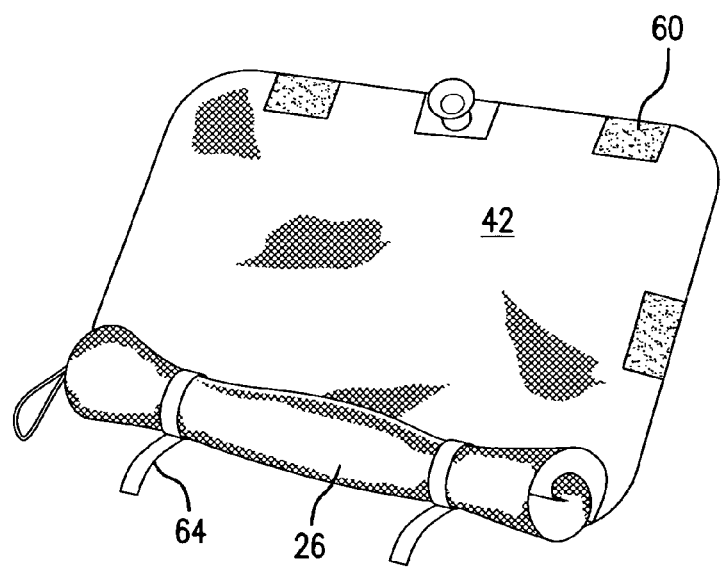

In the embodiments described above, the shade fabric 26 does not need to be permanently attached to the panel 22. It is possible to provide the shade fabric 26 as a separate piece of fabric that can be completely removably attached to the panel 22. For example, FIG. 9 illustrates the embodiment of FIG. 1 with the zipper 56 extending completely around the peripheries of the shade fabric 26 and the panel 22. FIG. 10 illustrates the embodiment of FIG. 2 with the VELCRO™ pads 60 extending around the peripheries of the shade fabric 26 and the panel 22. Referring to FIG. 11, the separate shade fabric 26 can be rolled up and tied to a side 32 of the panel 22 via tie members 64 provided along the side 32.

Figure 12:
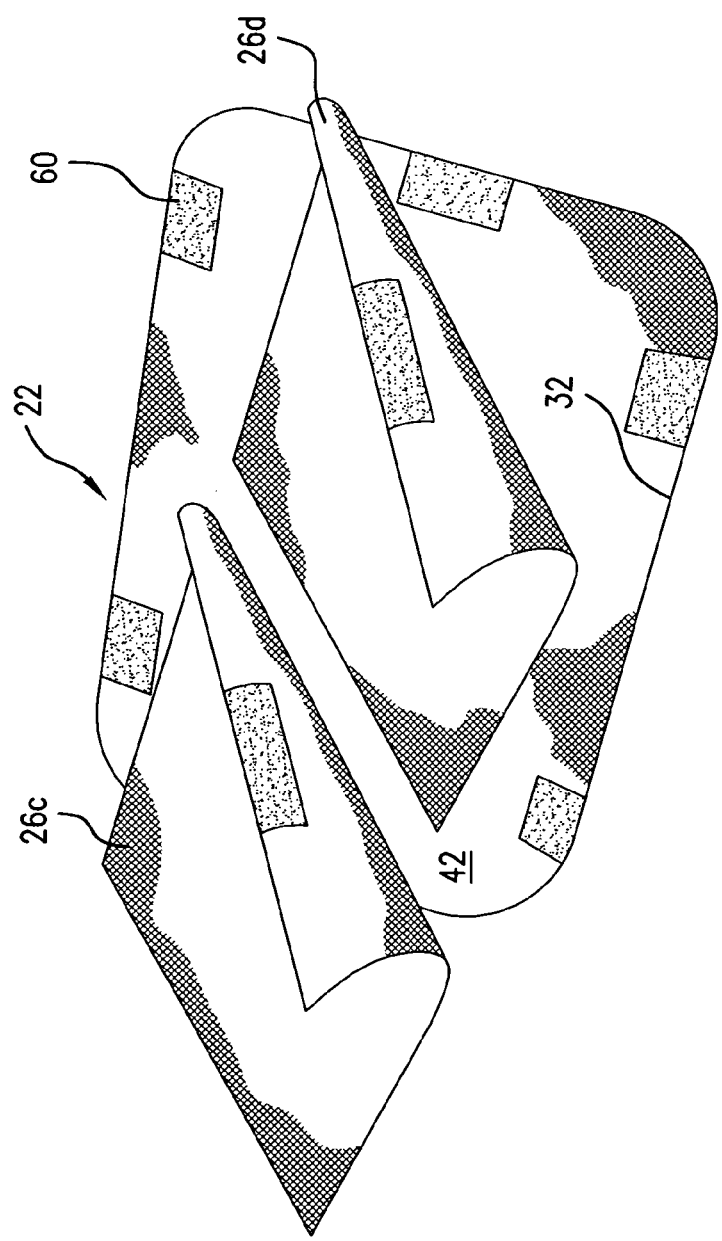

FIG. 12 illustrates yet another modification that can be made to the sunshade in FIGS. 10-11. The shade fabric 26 can be replaced by two separate shade fabrics 26c, 26d that can be completely detached from the panel 22. The provision of two separate shade fabrics 26c, 26d allows the user to completely cover selected portions of the panel 22, thereby providing additional flexibility in use.

Figure 13:

FIG. 13 combines the principles of FIGS. 1, 7 and 8. The sunshade in FIG. 13 comprises three of the sunshades 20 shown in FIG. 1, but hingedly connected to each other using the hinged connection shown in FIGS. 7 and 8. The embodiment of FIG. 13 provides a larger overall sunshade that can be used with larger windows, such as in recreational vehicles or inside buildings.

Figure 14:
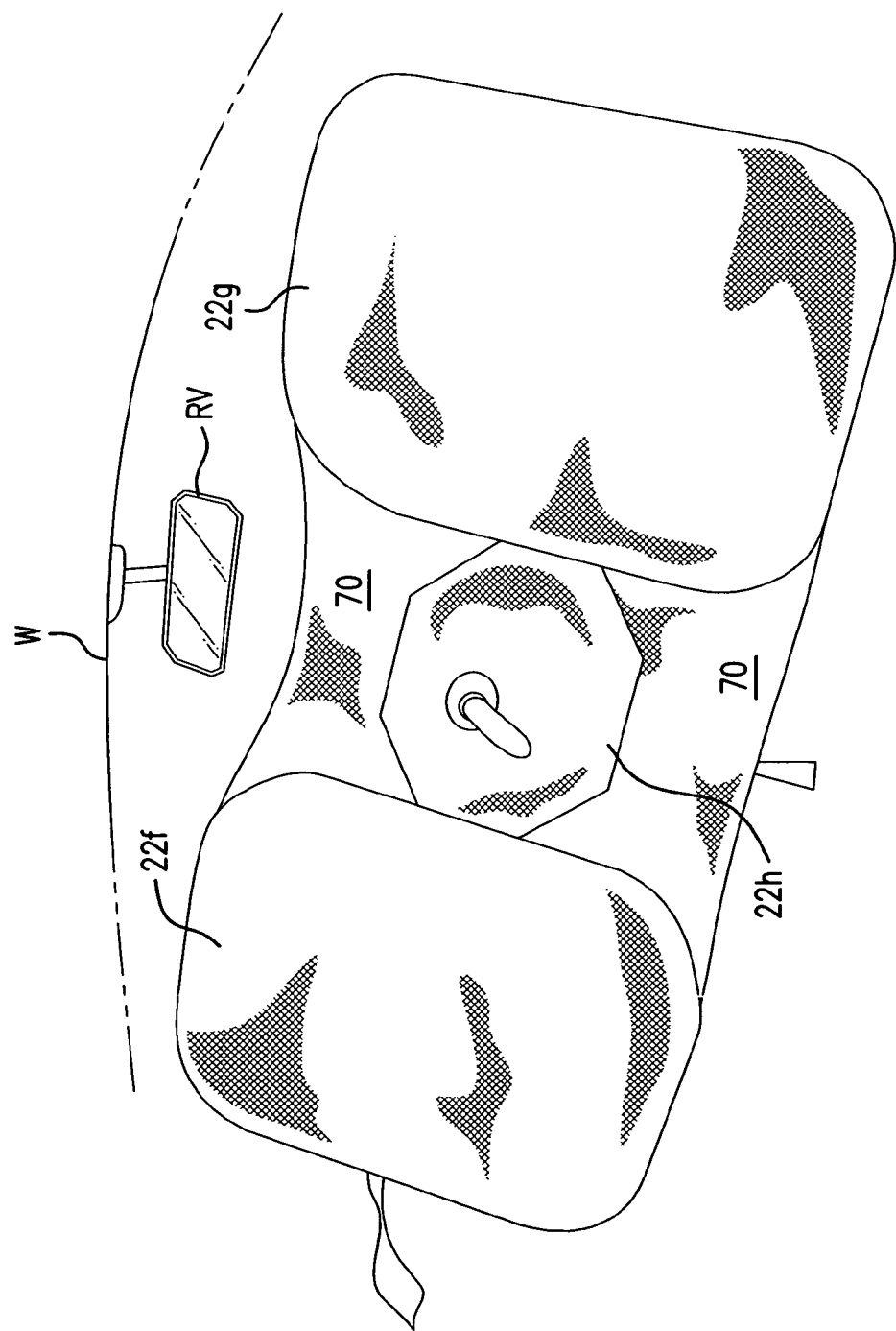

FIG. 14 illustrates a modification to the embodiment of FIG. 13. In FIG. 14, the sunshade is made up of three smaller panels that are different in size and/or shape. In FIG. 14, the panels 22f and 22g are the same size and shape, but the panel 22h is smaller and has a different shape. This embodiment is best suited for use with the windshield W, with the smaller panel 22h accommodating the location of the rear-view mirror RV. Additional fabric material 70 can be provided between the panels 22f, 22g, and above and below the panel 22h, to fill out the surface area of the windshield W.

Figure 15:
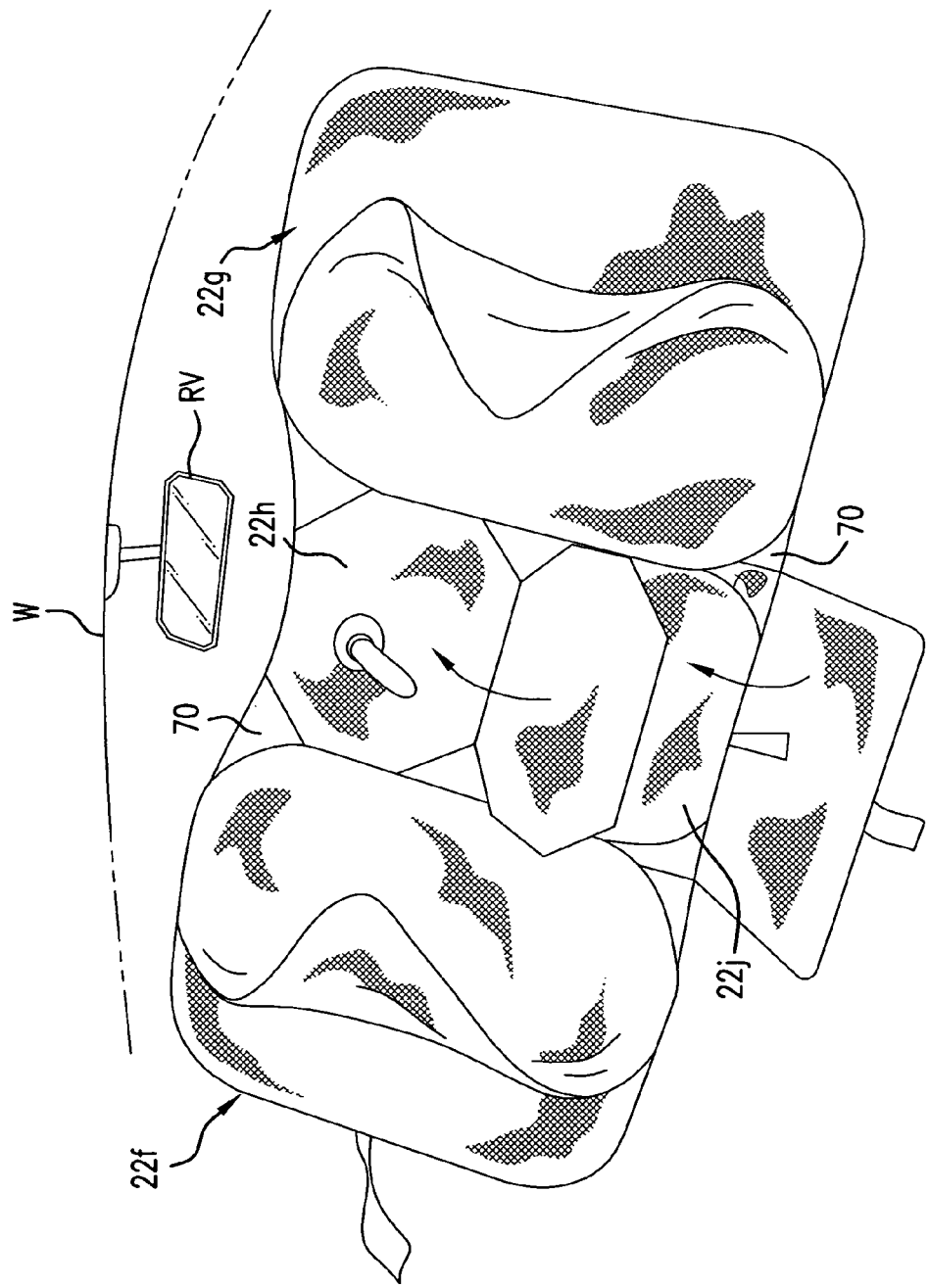

FIG. 15 extends the principles of FIG. 14 even further by illustrating the provision of another smaller panel 22j. The smaller panels 22h and 22j are provided one above the other, and between the larger panels 22f, 22g. As shown in these embodiments, a sunshade according to the present invention can be provided with one or more panels 22 arranged in any desired configuration so that the sunshade can be adapted for use in almost any desired location or environment.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible sunshade, comprising:
a panel comprising a foldable frame member having a folded and an unfolded orientation, with the frame member twisted and folded into a plurality of concentric frame members when in the folded orientation, the frame member defining a periphery for the panel with an interior space inside of the periphery, a meshed material covering the interior space defined by the frame member to form the panel when the frame member is in the unfolded orientation;
a first shade fabric having at least a portion thereof removably attached to the panel so that the first shade fabric can assume a first position in which the first shade fabric completely overlies, in a planar manner, a first portion of the meshed material, and a second position where the portion of the first shade fabric that is removably attached to the panel is disengaged from the panel to expose a portion of the meshed material; and
a second shade fabric having at least a portion thereof removably attached to the panel so that the second shade fabric can assume a first position in which the second shade fabric completely overlies, in a planar manner, a second portion of the meshed material, and a second position where the portion of the second shade fabric that is removably attached to the panel is disengaged from the panel to expose a portion of the meshed material wherein the first shade fabric has one edge that is permanently attached to the panel, and defines a pocket between the first shade fabric and the meshed material thereat, wherein the portion of the first shade fabric that is removably attached to the panel is stored inside the pocket when the sunshade is deployed in the second position.

2. The sunshade of claim 1, further including a frame retaining sleeve for retaining the frame member.

3. The sunshade of claim 1, wherein the frame member is continuous and enclosed.

4. The sunshade of claim 1, wherein the portions of the shade fabrics that are removably attached to the panel are removably attached via a zipper.

5. The sunshade of claim 1, wherein the portions of the shade fabrics that are removably attached to the panel are removably attached via VELCRO™ pads.

6. The sunshade of claim 1, wherein the meshed material has a plurality of small uniform openings.

7. The sunshade of claim 1, wherein a portion of the first shade fabric is permanently attached to the panel.

8. The sunshade of claim 1, wherein the entire first shade fabric is removable from the panel.

9. The sunshade of claim 1, wherein the first shade fabric has one edge that is permanently attached to the panel to define a pocket portion, and wherein the portion of the first shade fabric that is removably attached to the panel is folded back and attached to the pocket portion when the sunshade is deployed in the second position.

10. A collapsible sunshade, comprising:
first and second panels, each panel comprising:
a foldable frame member having a folded and an unfolded orientation, each frame member twisted and folded into a plurality of concentric frame members when in the folded orientation, the frame member defining a periphery for the panel with an interior space inside of the periphery,
a meshed material covering the interior space defined by the frame member to form the respective panel when the frame member is in the unfolded orientation;
wherein the first and second panels are hingedly connected to each other along an adjacent side of each panel; and
a shade fabric having at least a portion thereof removably attached to the two panels so that the shade fabric can assume a first position in which the shade fabric completely overlies, in a planar manner, the meshed material of the first panel, and a second position in which the shade fabric completely overlies, in a planar manner, the meshed material of the second panel.

11. The sunshade of claim 10, further including a frame retaining sleeve for retaining each frame member.

12. The sunshade of claim 10, wherein the frame member is continuous and enclosed.

13. The sunshade of claim 10, wherein the meshed material has a plurality of small uniform openings.

14. The sunshade of claim 10, wherein the shade fabric is a single piece of shade fabric.

* * * * *